(12) United States Patent
Kim et al.

(10) Patent No.: US 7,615,309 B2
(45) Date of Patent: Nov. 10, 2009

(54) LEAD MEMBER AND SECONDARY BATTERY MODULE WITH THE SAME

(75) Inventors: Jee Ho Kim, Daejeon (KR); Hyung Chan Kim, Seoul (KR)

(73) Assignee: LG Chem, Ltd. (KR)

( * ) Notice: Subject to any disclaimer, the term of this patent is extended or adjusted under 35 U.S.C. 154(b) by 658 days.

(21) Appl. No.: 11/012,415

(22) Filed: Dec. 15, 2004

(65) Prior Publication Data
US 2005/0140338 A1 Jun. 30, 2005

(30) Foreign Application Priority Data
Dec. 16, 2003 (KR) ............. 10-2003-0091736

(51) Int. Cl.
*H01M 2/24* (2006.01)
*H01M 2/02* (2006.01)
*H01R 24/00* (2006.01)
*H02J 7/04* (2006.01)

(52) U.S. Cl. ............ 429/158; 429/160; 429/178; 429/181; 439/627; 320/150

(58) Field of Classification Search ............ 429/149, 429/158, 159, 160, 162, 178, 181; 439/510, 439/513, 522, 627, 755, 762, 840, 841; 320/112, 320/150
See application file for complete search history.

(56) References Cited

U.S. PATENT DOCUMENTS 5,985,480 A * 11/1999 Sato et al. ............. 429/65
6,723,920 B2 * 4/2004 Higuchi et al. ......... 174/50
7,077,704 B2 * 7/2006 Ikeda et al. ............ 439/627
2001/0036574 A1 * 11/2001 Fukuda et al. .......... 429/161
2001/0046624 A1 11/2001 Goto et al. ............ 429/99

FOREIGN PATENT DOCUMENTS

| EP | 0 928 037 | 7/1999 |
|---|---|---|
| EP | 1 331 682 | 7/2003 |
| GB | 451511 | 8/1936 |
| GB | 1 447 503 | 8/1976 |
| JP | 2000-195480 | 7/2000 |
| JP | 2003-338269 | 11/2003 |
| RU | 2107360 | 3/1998 |
| RU | 2179769 | 2/2002 |
| SU | 184948 | 7/1966 |

OTHER PUBLICATIONS

PCT International Search Report; International Application No. PCT/KR2004/003276; International filing date Dec. 14, 2004; Date of mailing: Apr. 11, 2005.
Russia Notice of Allowance dated Apr. 17, 2007.
European Search Report dated Apr. 25, 2008.

* cited by examiner

Primary Examiner—Patrick Ryan
Assistant Examiner—Muhammad Siddiquee
(74) Attorney, Agent, or Firm—Cantor Colburn LLP

(57) ABSTRACT

Disclosed are a lead member and a secondary battery module having the same. The lead member is at least partially bent to connect two adjacent cells and form a single series circuit through electrode terminals of the cells. It is possible to easily and rapidly fabricating a battery module comprising a predetermined number of cells to meet various power demands for industrial instrument or electric cars by connecting the cells in series using detachable lead members.

17 Claims, 4 Drawing Sheets

LEAD MEMBER AND SECONDARY BATTERY MODULE WITH THE SAME

BACKGROUND OF THE INVENTION

1. Field of the Invention

The present invention relates generally to a lead member and a secondary battery module having the same, and more particularly to a secondary battery module having a plurality of cells stacked to a predetermined height and lead members diagonally inserted into insulating mediators to connect the cells in series and thereby output a desired battery power for industrial instrument or an electric car.

2. Description of the Related Art

A single unit cell has a limited output and a small power storing capacity. Therefore, a battery module comprising a plurality of cells is generally used in an electric car to secure sufficient power and driving hours.

As shown in FIG. 1, a conventional battery module 1 includes: a plurality of cells 2 disposed side by side; two electrodes 2a provided respectively on two outmost cells 2; two end plates 3 fastened to the outer sides of the two outmost cells; and a plurality of steel bands 4 surrounding the end plates 3 and the cells 2 as a whole.

In the prior art, however, leads 2b used to connect adjacent cells in series are welded to the electrode terminals of the cells, which makes it difficult to fabricate battery modules that meet various power demands for industrial instrument and electric cars.

Since the leads connecting the electrode terminals of adjacent cells in series are exposed, an accidental short circuit may occur in the cells due to an unintended drop of a metal conductor onto the leads, which eventually results in damage of the entire battery module.

Moreover, neither a cell protection circuit nor a safety device is used to protect the battery module against damage caused by abnormal overcurrent, overcharge or overdischarge conditions of the cells.

SUMMARY OF THE INVENTION

The present invention has been made to solve the above-mentioned problems occurring in the prior art, and an object of the present invention is to provide a detachable lead member for easily and rapidly fabricating a battery module comprising a predetermined number of cells to meet various power demands for industrial instrument or electric cars by connecting the cells in series using the detachable lead member.

Another object of the present invention is to provide a battery module having exposed lead members and electrode terminals of cells covered with insulating supports and fastened by fasteners to effectively prevent a short circuit that may occur in the cells due to an unintended drop of a conductor onto the battery module.

Still another object of the present invention is to provide a battery module having a cell protection circuit provided on each cell or a safety device provided on each lead member to protect cells or the battery module against overcurrent, overcharge or overdischarge conditions.

In order to accomplish the above objects of the present invention, lead members for a secondary battery module are at least partially bent to connect adjacent cells and form a single series circuit through electrode terminals of the cells stacked to a predetermined height.

Also, a secondary battery module according to the present invention uses lead members that are at least partially bent to connect adjacent cells and form a single series circuit through electrode terminals of the cells stacked to a predetermined height.

The foregoing and other objects, features and advantages of the present invention will become more apparent from the following detailed description when taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Figure 1:
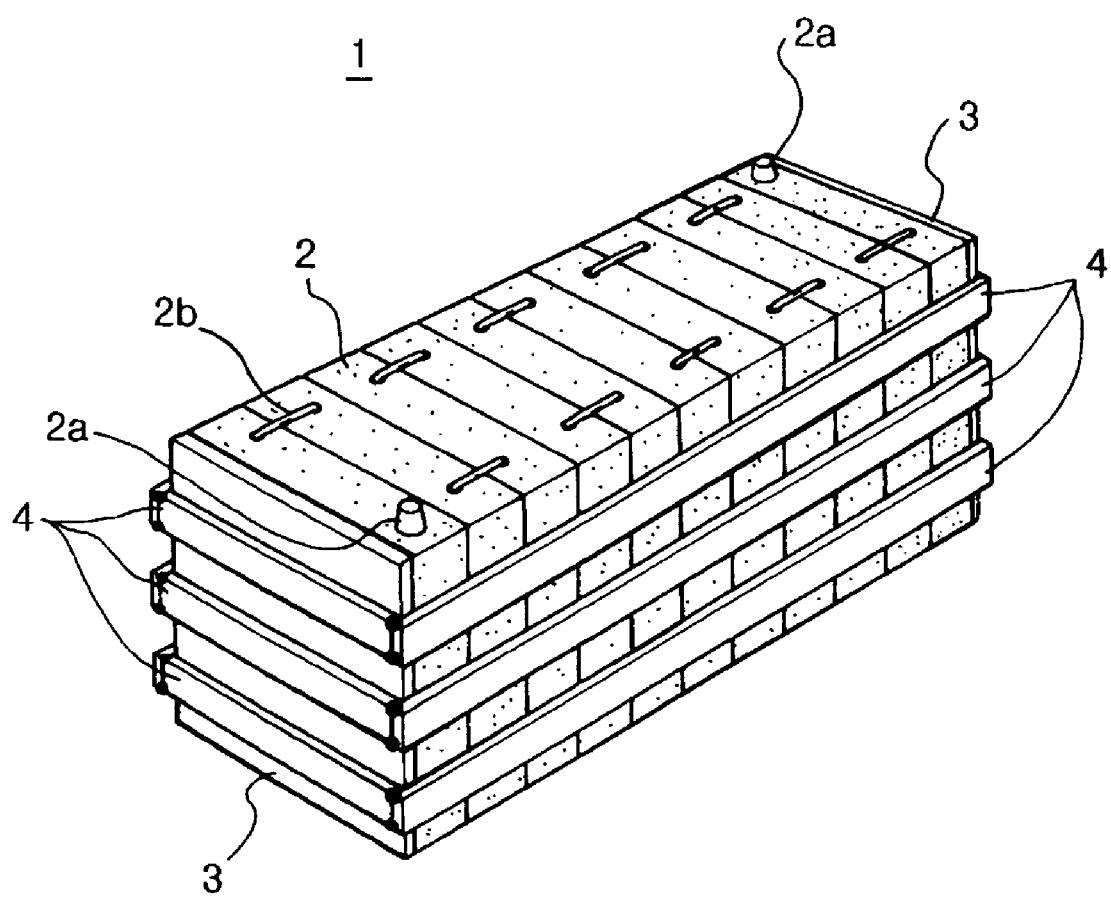
FIG. 1 is a schematic perspective view of a conventional battery module for an electric car.
Figure 2:
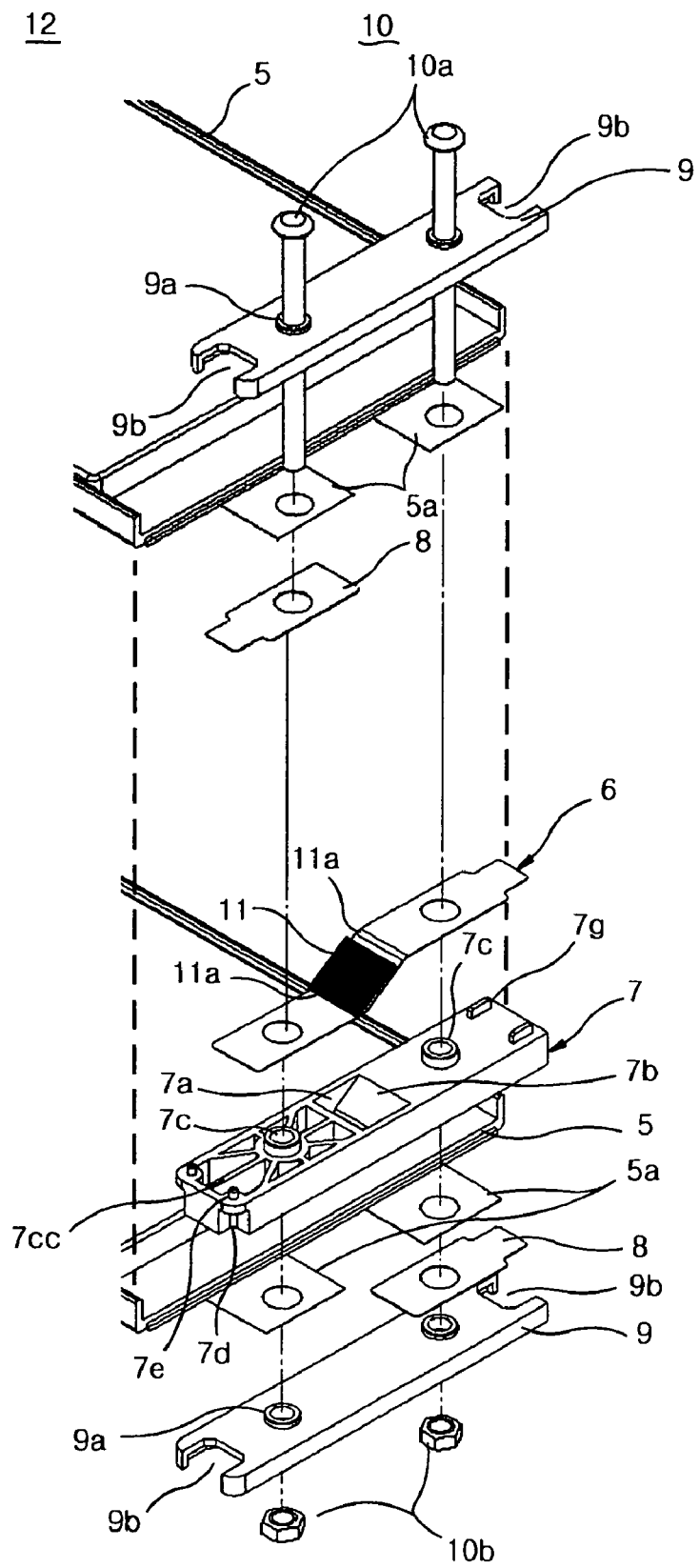
FIG. 2 is a schematic exploded perspective view of a secondary battery module according to the present invention.
Figure 3:
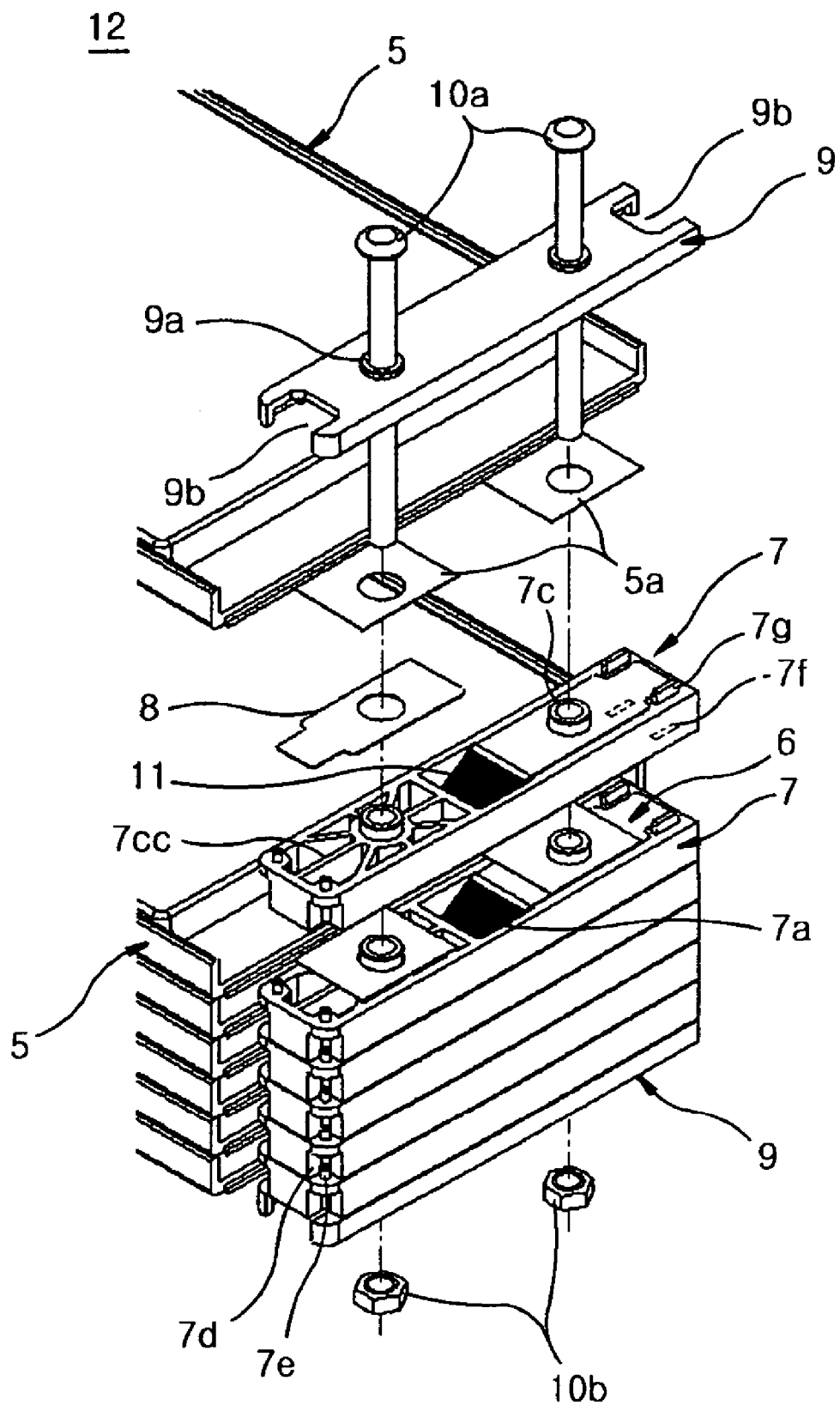
FIG. 3 is a schematic perspective view showing the sequential assembly of a secondary battery module according to the present invention.
Figure 4:
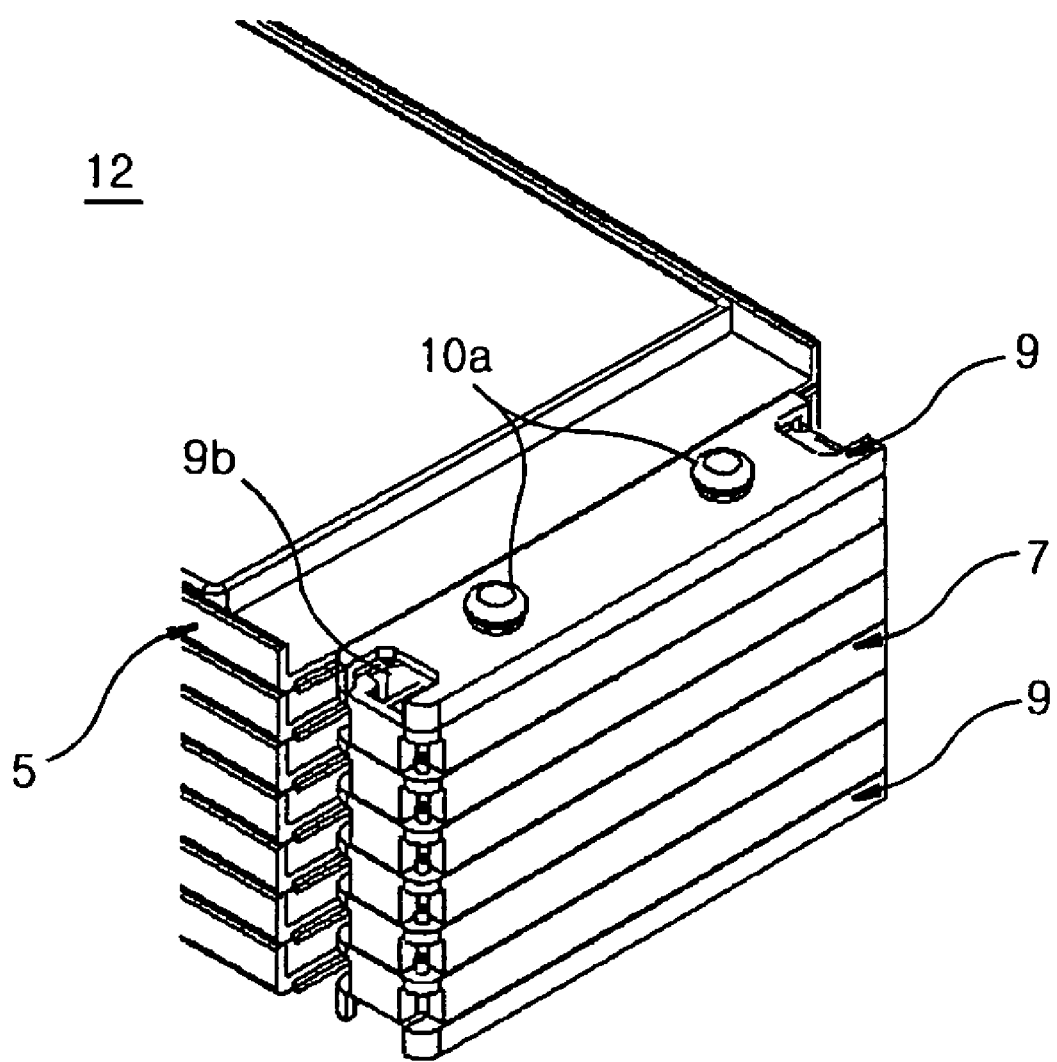
FIG. 4 is a schematic perspective view showing the completely assembled state of a secondary battery module according to the present invention.

Reference will now be made in detail to the preferred embodiments of the present invention as shown in FIGS. 2 to 4.

FIG. 2 is an exploded perspective view showing the secondary battery module according to the present invention. FIG. 3 shows the sequential assembly of the secondary battery module according to the present invention.

Referring to FIG. 2, cells 5 of the secondary battery module are stacked up to a predetermined height to connect adjacent cells by means of lead members 6. Each lead member 6 is at least partially bent to connect adjacent cells and form a single series circuit through corresponding electrode terminals 5a.

The lead members 6 may comprise a safety device 11 such as a fuse, bimetal breaker or PTC device to protect the cells 5 from overcurrent, overcharge and overdischarge. The safety device 11 rapidly cuts charging or discharging current to the cells 5 in the case of excessive temperature rise and restarts the flow of current when the cells are cooled again to a normal range of temperature. It is preferable to use a PTC device to fabricate the battery module in a compact size.

Preferably, the lead members 6 are made of at least one material selected from a group consisting of copper, aluminum, nickel-copper and copper-aluminum.

As shown in FIGS. 2 to 4, the secondary battery module according to the present invention has the cells 5 stacked to a predetermined height to connect adjacent cells by means of the lead members 6. The lead members 6 are used to form a single series circuit by connecting the electrode terminals 5a of every two adjacent cells.

The secondary battery module may further include insulating mediators 7 each having a hole 7a to guide the bent portion of each lead member 6.

The secondary battery module may further include two auxiliary terminals 8 disposed respectively on one electrode terminal 5a of the top cell and on the electrode terminal 5a of the bottom cell to be connected to corresponding electrode terminals 5a of the two outmost cells (top and bottom cells).

The secondary battery module may further include two insulating supports 9 for covering corresponding electrode terminals 5a of the two outmost cells of the cells 5 stacked and having a shape that partially expose corresponding auxiliary terminals 8.

In addition, the secondary battery module may further include a pair of fasteners 10 that coaxially penetrate holes formed on both sides of the insulating supports 9, lead members 6 and insulating mediators 7 and those formed on the electrode terminals 5a and auxiliary terminals 8 to insulatedly combine the insulating supports 9, lead members 6, insulating mediators 7, electrode terminals 5a and auxiliary terminals 8 into a single body.

Each lead member 7 has two safety device peripheries 11a bent at a predetermined angle with respect to the axial line of the lead member 7. Since each safety device periphery 11a bent at a predetermined angle with respect to the axial line of the lead member 7, the hole 7a formed on the corresponding insulating mediator 7 preferably has a sloping surface 7b forming a predetermined angle with respect to the axial line of the insulating mediator 7.

To prevent a short circuit of the cells 5 that may be caused by the lead members 6 and the fasteners 10, each insulating mediator 7 preferably has cylindrical bosses 7c at positions where the fasteners 10 penetrate.

Preferably, at least one of the cylindrical bosses 7c has a plurality of ribs 7cc formed in an outward radial direction so that heat transferred through the electrode terminals 5a of the cells 5 can be smoothly released out.

To stack up and fix the plurality of cells 5 to a predetermined height, each of the insulating mediators 7 has two cut portions 7d and two alignment projections 7e at one end, while having two interfitting recesses 7f and two interfitting projections 7g at the other end, respectively on the bottom and top portions thereof.

Each insulating support 9 has two cylindrical bosses 9a at positions where the two fasteners 10 penetrate in order to prevent an accidental short circuit of the cells 5 that may be caused by the electrode terminals 5a, auxiliary terminals 8 and fasteners 10. Also, each insulating support 9 preferably has an opening 9b cut in a longitudinal direction at least one end thereof.

The fasteners 10 consist of pairs of bolts 10a and nuts 10b or pairs of locking pins and locking rings (not shown). Bolts 10a and nuts 10b are more preferable to tightly fasten the plurality of cells 5 together to form a single battery module 12.

Each insulating mediator 7 and the insulating support 9 are preferably made of at least one material selected from a group consisting of PBT (polybutylene terephthalate), ABS (acrylonitrile-butadiene-styrene) and PC (polycarbonate) resin. Also, it is preferable for each cell 5 to provide a cell protection circuit (not shown) for protecting the cells 5 from overcurrent, overcharge or overdischarge conditions.

Hereinafter, the assembling process and operation of the above-described secondary battery module according to the present invention will be explained in detail.

A predetermined number of cells 5 are prepared and a lower insulating support 9 is placed on a worktable (not shown). One of two auxiliary terminals 8 is fixed on the insulating support 9 by fitting one of two cylindrical bosses 9a formed on the insulating support 9 into a through hole formed on the auxiliary terminal 8.

In this case, since the auxiliary terminal 8 is partially exposed through an opening 9b of the insulating support 9, it can be electrically connected to an external device (not shown).

Next, two electrode terminals 5a of a first cell 5 are arrayed on the two cylindrical bosses 9a of the insulating support 9. At this time, the two cylindrical bosses 9a of the insulating support 9 also fit into through holes formed on the two electrode terminals 5a.

Next, a lead member 6 that is bent stepwise is diagonally inserted into an insulating mediator 7 through a sloped hole 7a. The insulating mediator 7 coupled with the lead member 6 is placed on the electrode terminals 5a of the first cell 5.

In this case, one end of the lead member 6 contacts the sides of a plurality of ribs 7cc formed around one of two cylindrical bosses 7c of the insulating mediator 7 so that the heat generated from the cell 5 can be smoothly released out. Also, a safety device 11 provided at the center of the lead member 6 rapidly blocks the flow of current when the cell 5 is overheated, thereby protecting the cell.

Next, two electrode terminals 5a of a second cell 5 are arrayed on the two cylindrical bosses 7c of the insulating mediator 7. At this time, the two cylindrical bosses 7c of the insulating mediator 7 also fit into through holes formed on the two electrode terminals 5a.

In this case, the first and second cells 5 are connected in series by the lead member 6 diagonally inserted into the insulating mediator 7 through the sloped hole 7a.

Next, another lead member 6 is diagonally inserted into another insulating mediator 7 through a corresponding sloped hole 7a. The insulating mediator 7 coupled with the lead member 6 is placed on the electrode terminals 5a of the second cell 5.

In this case, each of the insulating mediators 7 has two cut portions 7d and two alignment projections 7e at one end thereof, while having two interfitting recesses 7f and two interfitting projections 7g at the other end thereof, thereby stacking up and fix the plurality of cells 5 to a predetermined height.

Next, after a desired number of the cells 5 are stacked up, the other auxiliary terminal 8 is placed under one of the electrode terminals 5a of the last topmost cell 5. An upper insulating support 9 is then placed under one of the electrode terminals 5a of the top cell 5. The upper insulating support 9, electrode terminals 5a of the cells 5, insulating mediators 7, auxiliary terminals 8 and the lower insulating support 9 are all tightly fastened together by means of the fasteners 10. More specifically, two bolts 10a are inserted through the coaxial holes formed on the above elements and then corresponding nuts 10b are screwed tightly onto the bottom ends of the bolts 10a.

In accordance with the present invention, it is possible to easily and rapidly fabricate battery modules that meet various power demands for industrial instrument or an electric car by connecting a predetermined number of cells in series using detachable lead members.

Since the exposed lead members and electrode terminals of the cells are covered with the insulating supports and tightly fastened using the fasteners, a short circuit that may occur in the cells due to an unintended drop of a conductor onto the battery module can be effectively prevented.

In addition, a cell protection circuit provided on each cell or a safety device provided on each lead member can protect the cells or the battery module against damage caused by overcurrent, overcharge or overdischarge conditions.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

What is claimed is:

1. A secondary battery module, which comprises:
   at least two cells stacked to a predetermined height;
   at least one lead member at least partially bent to connect adjacent cells and form a single series circuit through electrode terminals of the cells and detachably connected with corresponding electrode terminals of the adjacent cells; and
   at least one insulating mediator having a hole for guiding the bent portion of the lead member and cylindrical bosses at positions where at least two fasteners penetrate in order to prevent a short circuit caused by the lead member and the fasteners,
   wherein each insulating mediator has cut portions and alignment projections at one end, while having interfitting recesses and interfitting projections at the other end, respectively on the bottom and top portions thereof in order to stack up and fix the plurality of cells to a predetermined height.

2. The secondary battery module as claimed in claim 1, further comprising two auxiliary terminals disposed respectively on one electrode terminal of a top cell and on one electrode terminal of a bottom cell to be connected to corresponding electrode terminals of the two outmost cells.

3. The secondary battery module as claimed in claim 2, further comprising two insulating supports for covering corresponding electrode terminals of the two outmost cells of the cells and having a shape that partially exposes corresponding auxiliary terminals.

4. The secondary battery module as claimed in claim 3, wherein the two fasteners insulatedly fasten the insulating supports, the lead member, the insulating mediator, the electrode terminals and the auxiliary terminals together.

5. The secondary battery module as claimed in claim 1, wherein each lead member has safety device peripheries bent at a predetermined angle with respect to the axial line of the lead member and the hole formed on the corresponding insulating mediator has a sloping surface forming a predetermined angle with respect to the axial line of the insulating mediator.

6. The secondary battery module as claimed in claim 1, wherein at least one of the cylindrical bosses has a plurality of ribs formed in an outward radial direction so that heat transferred through the electrode terminals of the cells can be smoothly released out.

7. The secondary battery module as claimed in claim 3, wherein each insulating support has cylindrical bosses at positions where the fasteners penetrate in order to prevent an accidental short circuit caused by the electrode terminals, auxiliary terminals and fasteners.

8. The secondary battery module as claimed in claim 3, wherein each insulating support has an opening cut in a longitudinal direction at least one end thereof.

9. The secondary battery module as claimed in claim 4, wherein said fasteners consist of pairs of bolts and nuts.

10. The secondary battery module as claimed in claim 1, wherein said insulating mediators are made of at least one material selected from a group consisting of PBT (polybutylene terephthalate), ABS (acrylonitrile-butadiene-styrene) and PC (polycarbonate) resin.

11. The secondary battery module as claimed in claim 3, wherein said insulating supports are made of at least one material selected from a group consisting of PBT (polybutylene terephthalate), ABS (acrylonitrile-butadiene-styrene) and PC (polycarbonate) resin.

12. The secondary battery module as claimed in claim 1, wherein each cell includes a cell protection circuit for electrical protection from overcurrent, overcharge or overdischarge conditions.

13. The secondary battery module as claimed in claim 1, wherein said lead member has a safety device on at least one portion thereof.

14. The secondary battery module as claimed in claim 13, wherein said safety device is a PTC (Positive Temperature Coefficient) device.

15. The secondary battery module as claimed in claim 1, wherein said lead member is made of at least one material selected from a group consisting of copper, aluminum, nickel-copper and copper-aluminum.

16. The secondary battery module as claimed in claim 13, wherein said lead member is made of at least one material selected from a group consisting of copper, aluminum, nickel-copper and copper-aluminum.

17. The secondary battery module as claimed in claim 14, wherein said lead member is made of at least one material selected from a group consisting of copper, aluminum, nickel-copper and copper-aluminum.

* * * * *